United States Patent
Jameson et al.

(10) Patent No.: US 7,167,452 B2
(45) Date of Patent: Jan. 23, 2007

(54) SELECTION OF DATA TO BE TRANSMITTED BETWEEN NODES IN A NETWORK HAVING LIMITED BANDWIDTH

(75) Inventors: Stephen Mitchell Jameson, Wilmington, DE (US); Henry Hindle Mendenhall, Shamong, NJ (US); Kenneth Robert Whitebread, Medford, NJ (US); Lori Ann Pridmore, Mt. Laurel, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 1057 days.

(21) Appl. No.: 10/200,958

(22) Filed: Jul. 23, 2002

(65) Prior Publication Data

US 2004/0017817 A1 Jan. 29, 2004

(51) Int. Cl.
*H04L 12/54* (2006.01)
(52) U.S. Cl. .................................. 370/252; 370/468
(58) Field of Classification Search ............... 370/252, 370/465, 468
See application file for complete search history.

(56) References Cited

U.S. PATENT DOCUMENTS 7,012,902 B1* 3/2006 Omi et al. ............... 370/310.1
2003/0078050 A1* 4/2003 Carlborg et al. ............ 455/452

* cited by examiner

*Primary Examiner*—Melvin Marcelo
(74) *Attorney, Agent, or Firm*—Duane Morris, LLP (57) ABSTRACT

Communication is provided among plural nodes by a network having finite bandwidth between the nodes. The bandwidth may differ for each direction of propagation. Each node includes a processor for processing locally available data, including data derived locally and available through relatively high-bandwidth paths. When processing at any one of the nodes may be improved by incorporating into the data being processed information which is locally available at another node, at least one node is configured to know (a) the directional bandwidth from itself to the remote node(s) of the system, and (b) also to have knowledge, of the relative improvement to be realized at the first node by incorporation of data of the second node into the processing of the first node. The second node selects portions of its own local data for transmission to the first node which yield large improvement and can be transmitted within the available directional bandwidth. (149)

2 Claims, 5 Drawing Sheets

SELECTION OF DATA TO BE TRANSMITTED BETWEEN NODES IN A NETWORK HAVING LIMITED BANDWIDTH

FIELD OF THE INVENTION

This invention relates to communication of information among the various nodes of a communication network in which the various nodes receive data locally, and perform processing on the received local data, and more particularly to such systems in which at least some nodes can make use of information from other nodes in performing their processing.

BACKGROUND OF THE INVENTION

Networked systems using multiple processors are widely used, as for example by aircraft and other vehicles for fly- or control-by-wire applications, for command and control systems, and for warehouse inventory maintenance. In many such systems, various sources are used for providing information about the system's environment. In the context of an aircraft or vehicle, the sensors may measure speed, pitch, roll, yaw, fuel or propellant status, and the like, an provide such information, and various derivatives of the information, to the operator, and to motive and control devices. In the context of a command and control system, the sensors may include radar, sonar, and visual detection systems, and may also include own-vehicle sensors such as those mentioned for vehicle control, as well as additional sensors, such as for example GPS location sensors and weapon loading status sensors. In the context of a warehouse inventory control system, the sensors may include bar-code or other scanners, bin or other storage location full/empty status, and the like. In all cases, some of the data may be entered by hand, or may otherwise be essentially fixed over the short term, and other data may be provided as a stream of current data, representing a continual status update.

In such systems, processing may be performed at a variety of network nodes, and some of the nodes may be associated with local processing. In the context of a vehicle, a sensor, such as an actuator position sensor, may provide information to a local processor, which causes the actuator to assume the commanded state given the system status and environmental conditions, and which may take action in the event of malfunction. In the context of a command and control system, a vehicle or fixed site may have plural sensors for providing indications of status, position, speed and heading, altitude, weapon status, and fuel reserve, and the local processing may be on a vehicle-wide basis rather than on a subsystem basis, for control of the vehicle and its weapons. In the context of a warehouse, the system may automatically dispatch stored products from their known locations, monitor and reorder stock as required, receive replacement stock and route the replacements to suitable storage space, and the like.

In many such systems, the reliability or accuracy of the various computations will be enhanced by including in the calculations information from sensors at locations remote from the location at which the computations are being performed. In the context of a vehicle, plural fuel or propellant sensors may together provide information leading to a more accurate representation of the actual amount of fuel or propellant than a single sensor would provide. In the context of a command and control military system, determination of threats and potential targets may be enhanced by including in the computations information from radar systems other than the local radar system. In the context of a warehouse or storage system, the use of plural sensors associated with a product flow path may give information about product losses along the length of the path. Ideally, such systems would use all the available information in performing their calculations.

Networked systems are in common use. Their limitations are all too well known. For one thing, the transmission paths through a network take time, so that information cannot proceed instantly from one remote location to another. In addition, all transmission paths are subject to bandwidth or data rate limitations. For example, peaks in usage or utilization of a network can result in reduction in bandwidth available to all users, and can additionally result in lost data and or slow operation. In some contexts, slow operation may not be more than an inconvenience, but it may have economic impact in the warehouse situation, and life-threatening or otherwise disastrous impact in the case of a command and control system or a vehicle actuator controller. For this reason, it is desirable to control the data throughput of a networked system.

Figure 1:
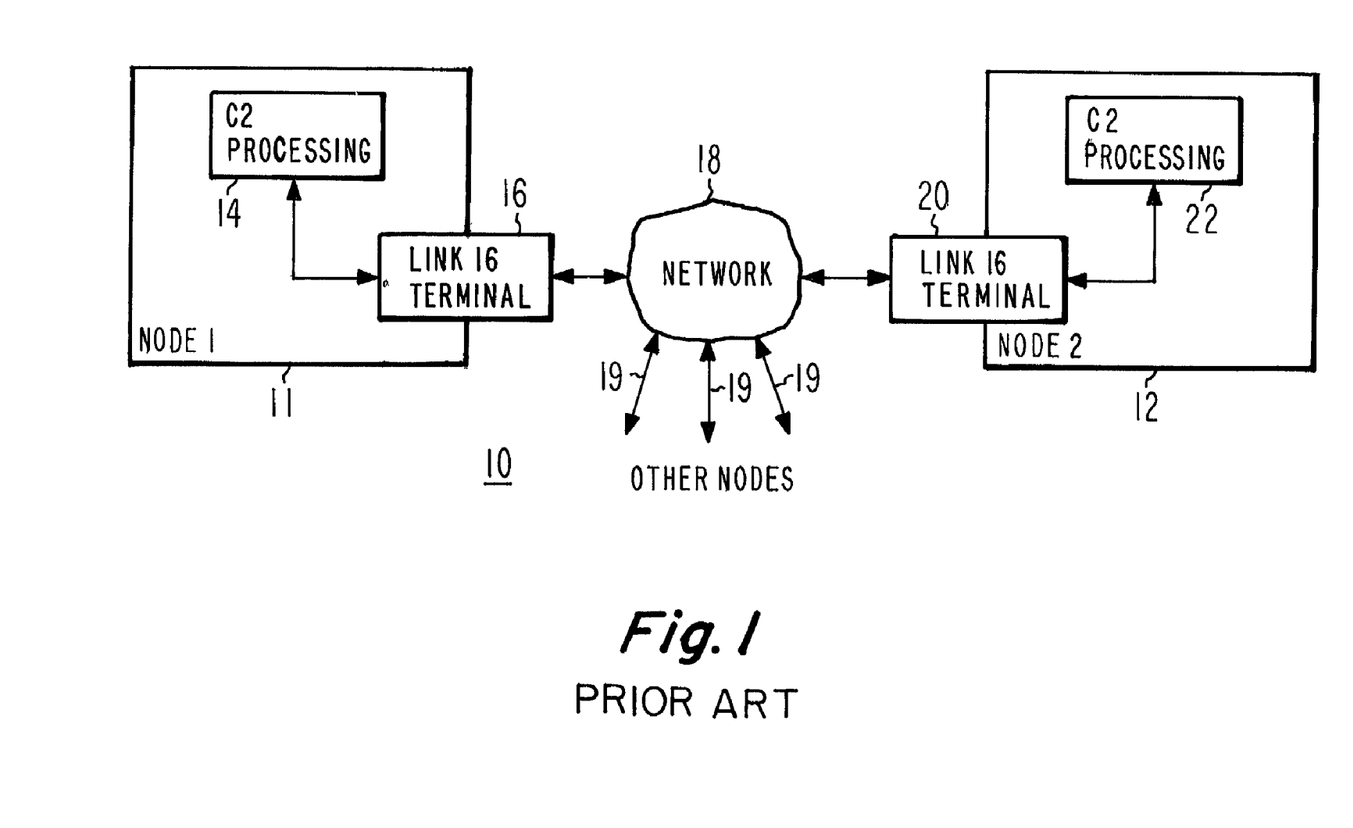
FIG. 1 is a simplified block diagram of a prior-art communication system.

The "Link 16" system is a networked command and control system which is currently in use by the U.S. Navy. FIG. 1 is a simplified block diagram of a Link 16 system 10. In system 10 of FIG. 1, a first node 11 includes a command and control (C2) processing arrangement 14, which communicates with a network 18 by way of a Link 16 terminal 16. Another or second node 12 of system 10 also includes a C2 processing arrangement 22, which communicates with network 18 by way of a Link 16 terminal 20. Other similar nodes (not illustrated) are coupled to network 18 by way of paths designated as 19. In the arrangement of system 10 of FIG. 1, each of nodes 11 and 12 may be viewed as representing a vehicle. Many different types of messages are transmitted, in a broadcast manner, among the various nodes of the system 10. Among the message types which are communicated, there are engagement coordination messages, which are used to coordinate threat track numbers, to assure that multiple nodes do not simultaneously engage the same threat. Own-platform position messages are transmitted by each ship, vehicle or node, to identify to other nodes its own location, speed, and heading. Track association messages are transmitted under in the situation in which two previously separate tracks are determined to represent the same object. Track or target information is also transmitted between or among the various nodes of the Link 16 system. The track information includes track position information, track velocity information (which inherently includes track heading information), and track quality information (which inherently includes positional uncertainty information). The track information which is transmitted between or among the nodes of a Link 16 system also identifies the target as friend or foe, and includes identification of the source of the information and the time at which the information was generated. Link 16 controls network loading by prioritizing access to the network based upon the type of message which is to be transmitted. Thus, the priorities assigned to the various messages depend upon the preassigned categories.

Improved data transfer methods are desired for networked systems including plural nodes.

SUMMARY OF THE INVENTION

The invention is predicated, in part, upon the understanding that the Link 16 system transmits information in a broadcast manner, which information is prioritized for transmission based upon the class or type of information, and not upon its content. The information may be addressed to a particular recipient. By contrast, the invention, in one aspect, transmits information (in a broadcast or narrow-cast manner) to an identified recipient of such information based upon that recipient's interest in, or need for, the information. In another aspect, the information sent to the recipient is selected, at least in part, based on the bandwidth available between the sending node and the receiving node.

More particularly, a method according to an aspect of the invention, for transmitting information among the nodes of a system or network defining a directional bandwidth between node pairs, includes the step of receiving local information at first and second nodes of the system, to thereby define first and second node local data, respectively. Processing is performed at the first node on at least a portion of the first node local data, to thereby produce first node processed data, at least some of which first node processed data is improved by including in the processing at least some of the second node local data. The second node is pre-loaded with a function which represents the value of the improvement to the first node processed data which is gained by the incorporation into the processing at the first node of various elements of the second node local data. The second node is also preloaded with information relating to an effective directional bandwidth which is at least one of (a) the maximum value of the directional bandwidth from the second node to the first node, (b) the maximum rate at which information can be processed at the first node and (c) the lesser of the maximum value of the directional bandwidth from the second node to the first node and the maximum rate at which information can be processed at the first node. The second node transmits over the network to the first node that portion of the second node local data which (a) has the greatest value of the function and (b) can be transmitted within the effective directional bandwidth from the second node to the first node.

In a particular mode of the method according to the invention, the method includes the further step of performing processing at the second node on at least a portion of the second node local data to thereby produce second node processed data, which second node processed data is improved by including in the processing at least some of the first node local data. In addition, the first node is preloaded from the second node with a function which represents the value of the improvement to the second node processed data which is gained by the incorporation into the processing at the second node of various elements of the first node local data. The first node is also preloaded with information relating to an effective directional bandwidth which is one of (a) the maximum value of the directional bandwidth from the second node to the first second node, (b) the maximum rate at which information can be processed at the second node and (c) the lesser of the maximum value of the directional bandwidth from the second node to the first node and the maximum rate at which information can be processed at the second node. The first node transmits, over the network to the second node, that portion of the first node local data which has the greatest value of the function and can be transmitted within the effective directional bandwidth from the first node to the second node.

DESCRIPTION OF THE INVENTION

Figure 2:
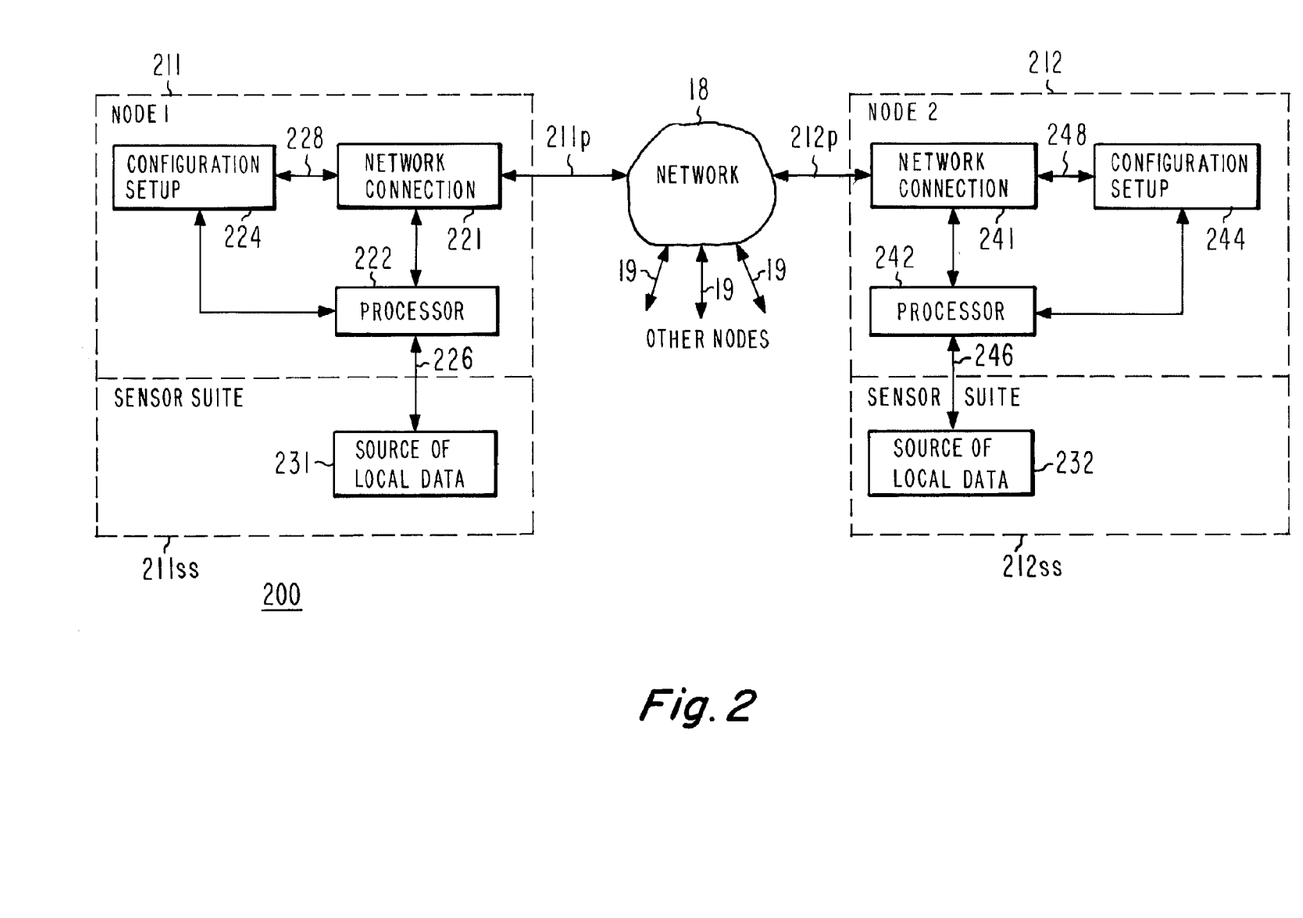
FIG. 2 is a simplified block diagram of a networked system according to an aspect of the invention.

FIG. 2 is a simplified block diagram of a system 200 according to an aspect of the invention. In FIG. 2, a first node 211 communicates by way of a path 211p, network 18, and a further path 212p with a second node 212. As in the case of FIG. 2, network 18 is connected to other nodes, as suggested by paths 19. Nodes 211 of FIG. 2 is representative of at least some nodes of the system 200. In FIG. 1, node 211 includes a network connection apparatus illustrated as a block 221. Block 221 may be, in one embodiment of the invention, no more than a modem suitable for accessing other nodes of system 200 through network 18. It may be desirable for network connection block 221 to be capable of providing sophisticated security. Connection block 221 is connected within node 211 with a processor 222, which is configured at turn-on and on command from a configuration or setup control block 224. While a single processor is illustrated, those skilled in the art will understand that multiple processors may be used, at various different locations within the node, with each concentrating on a different aspect of the various tasks which may be processed.

First node 211 of system 200 of FIG. 2 is associated with a source 231 of local data, which in the illustrated embodiment is part of a sensor suite 211ss associated with node 211. The sensor suite may include input information from human operators, which can be entered by means of a keyboard or mouse. The connection of source 231 of local data to processor 222 is by way of a path 226 which has a substantially greater bandwidth than a path which can be expected to be formed by connection block 221 to another node of the system 200 through network 18. This state of affairs would be the case in a situation in which first node 211 is co-located with the sensor suite, as by being on the same vehicle or at the same location, so that dedicated wide-bandwidth paths can interconnect the processor 222 with the sensor suite 211ss, or such that the path 226 might include a lightly-loaded local network in which the useful bandwidth exceeds that of more heavily loaded network 18.

Second node 212 is similar to node 211 in the simplified representation of FIG. 2, but its characteristics might be very different. Node 212 might be a command and control center, another fixed site such as an artillery site, or another vehicle of a different sort than that of node 211. As an example of another vehicle, node 211 might be associated with an attack helicopter, and node 2 might be associated with a spotter team in a land-based scout vehicle. Whatever the nature of node 212, it communicates with other nodes of the system, including node 211, by way of path 212p and network 18.

Second node 212 of FIG. 2 includes a network connection apparatus illustrated as a block 241. Block 241 may be, in one embodiment of the invention, no more than a modem suitable for accessing other nodes of system 200 through network 18. As with the case of first node 211, it may be desirable for network connection block 241 to be capable of providing sophisticated security. Connection block 241 is connected within node 212 to a processor 242, which is configured at turn-on and on command from a configuration or setup control block 244. Second node 212 of system 200 of FIG. 2 is associated with a source 232 of local data, which in the illustrated embodiment is part of a sensor suite 212ss associated with node 212. The connection of source 232 of local data to processor 222 is by way of a path 246 which has a substantially greater bandwidth than a path which can be expected to be formed by connection block 241 to another node of the system 200 through network 18.

The processing which is performed at the first node 211 is performed, at least in part, on the local data from its own sensors. This processing might include navigation functions, which plot a path for the vehicle through the terrain, based on topological information from sensor suite 211ss, and this navigation function might be supplemented by global positioning system information derived from one or more onboard GPS receivers. The processing might include analysis of sensor signals, to aid in identifying friendly and hostile forces, and noncombatants, so that appropriate actions could be suggested to the pilot or operator. It is the nature of such processing that it is always advantageous to have more information available for consideration in the making of decisions. Put another way, any single sensor suite can only sense the local environment from a particular perspective or point of view. Other sensors in the environment may, for various reasons, have information which could be considered during the processing performed by processor 222 of first node 211, were it available. However, one of the apparently insurmountable obstacles to free sharing of information among the processors of system 200 of FIG. 2 is the limited bandwidth of the network 18. This bandwidth has an inherent maximum throughput, which may depend upon the equipments available, network transmission conditions, including the possibility of intentional interference with the network so as to attempt to deny the use thereof to one party or the other, the need for cryptographic techniques, and the like. In the case in which the network includes free-space transmission paths, even weather conditions may affect the available bandwidth. The net effect of all of these considerations is that the node-to-node paths between or among the various nodes using the network have limited bandwidth. The limited bandwidth, in turn, means that the information available at a given node can be transmitted to other nodes at only a limited rate. In many cases, the amount of sensor data available to the nodes of a system as a whole will be much greater than that which can be transmitted in real time over the network. Consequently, some of the sensor data can be transmitted over the network to other nodes, but not all of it can be so transmitted.

According to an aspect of the invention, each node evaluates its own available local data, such as the data from its own associated sensor suite. The local data can be evaluated very quickly, because the interconnection paths at the node and its associated source of local data are wideband. According to a further aspect of the invention, each node of FIG. 2 includes priority information which sets forth the advantage to at least some of, and preferably all of, the nodes of the system 200, of having available various types of information. Thus, in the example in which first node 211 is associated with a helicopter, second node 212 might be associated with a mobile ground spotter. The second node 212 might have available to it detailed information as to the friendly, hostile, or noncombatant nature of the forces in the vicinity of the mobile ground station. This identification information could be very useful to both the navigation and the targeting aspects of the processing in the helicopter, because its own sensor suite might include only thermal sensors for identification of ground forces, and such sensors could not distinguish friend from foe or noncombatant. Thus, it would be very advantageous to the helicopter crew to have this particular aspect of the information available to the mobile ground station. According to an aspect of the invention, the second node 212 of FIG. 2 includes, in its configuration or setup block 244, information relating to the relative value to the first node 211 of having available information from the sensor suite 212ss of second node 212.

In addition, according to another aspect of the invention, each node of the system 200 of FIG. 2, including at least second node 212, maintains information relating to the directional bandwidth through the system to the various other nodes of the system. Thus, the configuration information found in block 244 of second node 212 of FIG. 2 includes known values of bandwidth through network 18 to each, or at least some, of the other nodes of the system 200, including first node 211. This bandwidth may differ for each one of the nodes to which connection might be made, due to differing equipments and conditions. In general, it will not be possible to instantaneously determine the bandwidth to a desired one of the other nodes, because (a) the determination of bandwidth itself consumes bandwidth, which is presumably at a premium during the times at which information communication or transmission is desired, so the attempt to instantaneously determine the bandwidth might use bandwidth more profitably used to transmit information, and (b) the determination of bandwidth requires some finite time, and transmission of presumably vital messages might be delayed by the need to perform such bandwidth determinations. Thus, while an instantaneous determination of bandwidth might be desirable, it is likely not to be practicable for at least some communication systems. Instead, the directional bandwidth is determined by analysis, using a mathematical model of the network, or it is determined a priori by actual test, and the results are stored in the configuration block 244 of second node 212 of FIG. 2. It should be noted that, if measured values of bandwidth are measured a priori under given network conditions, a mathematical model may be used to update the previous empirically determined value to correct for actual measured communication system loading, which can be measured at any node more or less instantaneously. However determined, each node which is to transmit information has a repository of information, estimated or measured, or both, about the current node-to-node directional bandwidth.

According to a further aspect of the invention, only that information which has the greatest value to the recipient node is transmitted by another node, and the amount of information chosen for transmission is that which can be transmitted within the currently available bandwidth. In this way, the system does not tend to become choked with attempts to transmit more information than can be accommodated, and the most important information is transmitted to the exclusion of, or at least preferentially relative to information deemed to be of lesser value. Thus, each node, including second node 212 of FIG. 2, includes a processing method or algorithm which evaluates the local data, which in the embodiment of FIG. 2 is the information from the local sensor suite 212ss, to determine, for each other node of the system 200, the relative value to that other node of inclusion within its processing of the information in question.

Figure 3A:
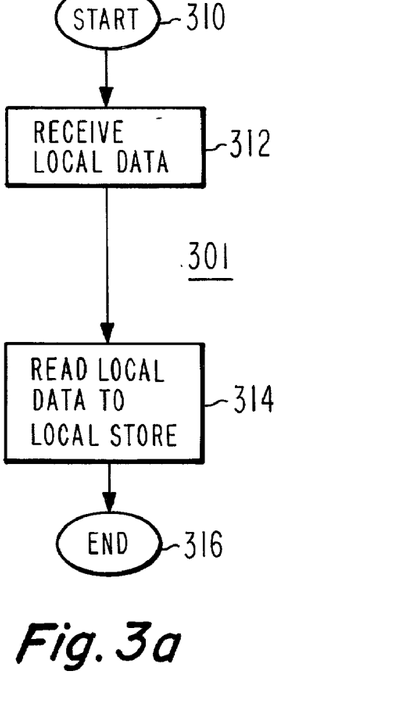
FIGS. 3a, 3b, and 3c together represent a simplified logic flow or chart illustrating concurrently-running logic operations taking place at a first node of the network of FIG. 2 in accordance with an aspect of the invention.

FIG. 3a is a simplified logic flow chart or diagram illustrating one of three concurrent logic processes which run in "parallel" at first node 211 of FIG. 2. In FIG. 3a, the logic begins at a START block 310, and proceeds to a logic block 312, which represents the reception of local data. In the case of node 211 of FIG. 2, this corresponds to reception of information from sensor suite 211ss. From block 312, the logic of FIG. 3a proceeds to a block 314, which represents the placement of the sensor data in a local store or memory. From block 314, the logic flows to an END block 316. The logic of FIG. 3a operates each time sensor data is received, which may well be continuously. Those skilled in the art will recognize that the local store or memory will need to be purged of old or obsolete information either from time to time or continuously. The logic of FIG. 3a simply receives data produced by the sensor suite or source of local data, and stores it for use by other processing functions of first node 211 of FIG. 2.

Figure 3B:
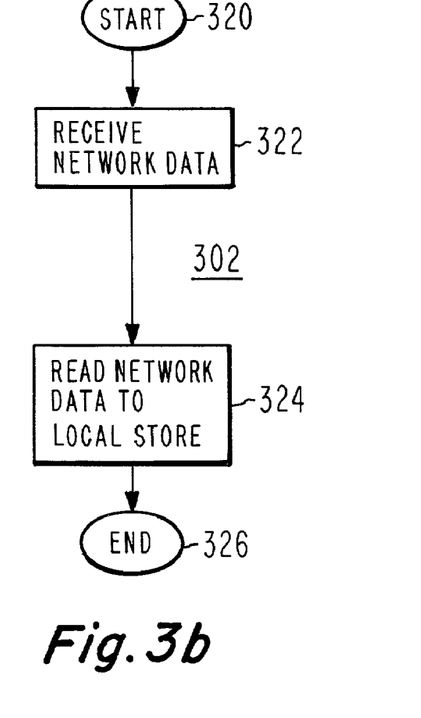

FIG. 3b is a simplified logic flow chart or diagram illustrating another of the concurrent logic flows associated with first node 211 of FIG. 2. In FIG. 3b, the logic begins at a START block 320 and proceeds to a block 322, which represents the reception of information by way of the network 18 of FIG. 2. When information is received from the network, the logic of FIG. 3b flows to a logic block 324, which represents the reading of the network data to a local store or memory, just as in the case of the sensor data. Finally, the logic leaves block 324 and arrives at a logic STOP block 326. The logic of FIG. 3b simply receives information over the network, and stores the information so received so that it may be used by other portions of the logic of first node 211 of FIG. 2.

Figure 3C:
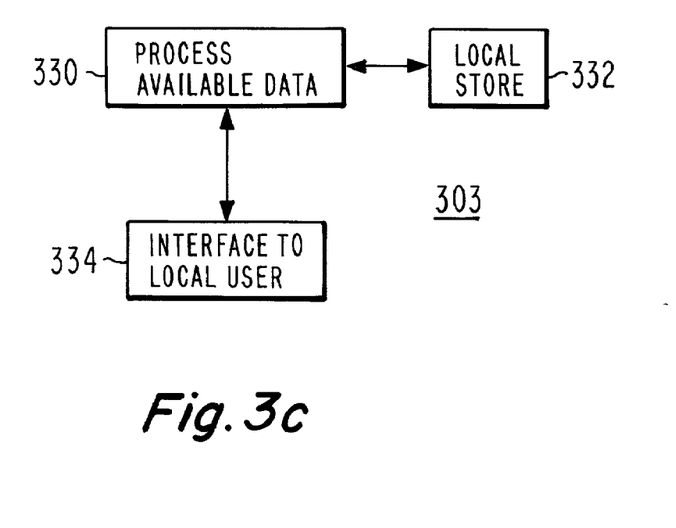

FIG. 3c is a simplified logic flow chart or diagram illustrating the processing performed by processor 222 of first node 211 of FIG. 2. In FIG. 3b, block 330 represents the performing of processing at the first node 21 of FIG. 2, drawing on information stored in the local store, as represented by block 332. The local store includes information from the local source of information or data, and also includes whatever information has been received from other nodes by way of the network. The results of the processing are made available to a local pilot or operator, as represented by block 334. The processing may be for, in the example, the abovementioned navigation or targeting. In the navigation aspect, knowing the positions of hostile forces may allow the track taken by the helicopter to deviate to avoid overflying or directly approaching those positions, and the targeting aspect may use the information to direct weapons toward the positions. On the other hand, if information were transmitted from the second node 212 of FIG. 2 to the first node 211 without regard to the relative value of the information and without regard for the directional bandwidth through the network 18, relatively unimportant information might be transmitted before the important information, or an attempt might be made to transmit more information, both useful and useful, than the network could carry within a reasonable time interval, so that the network might be overloaded and slow down, to the detriment of all users.

Figure 4:
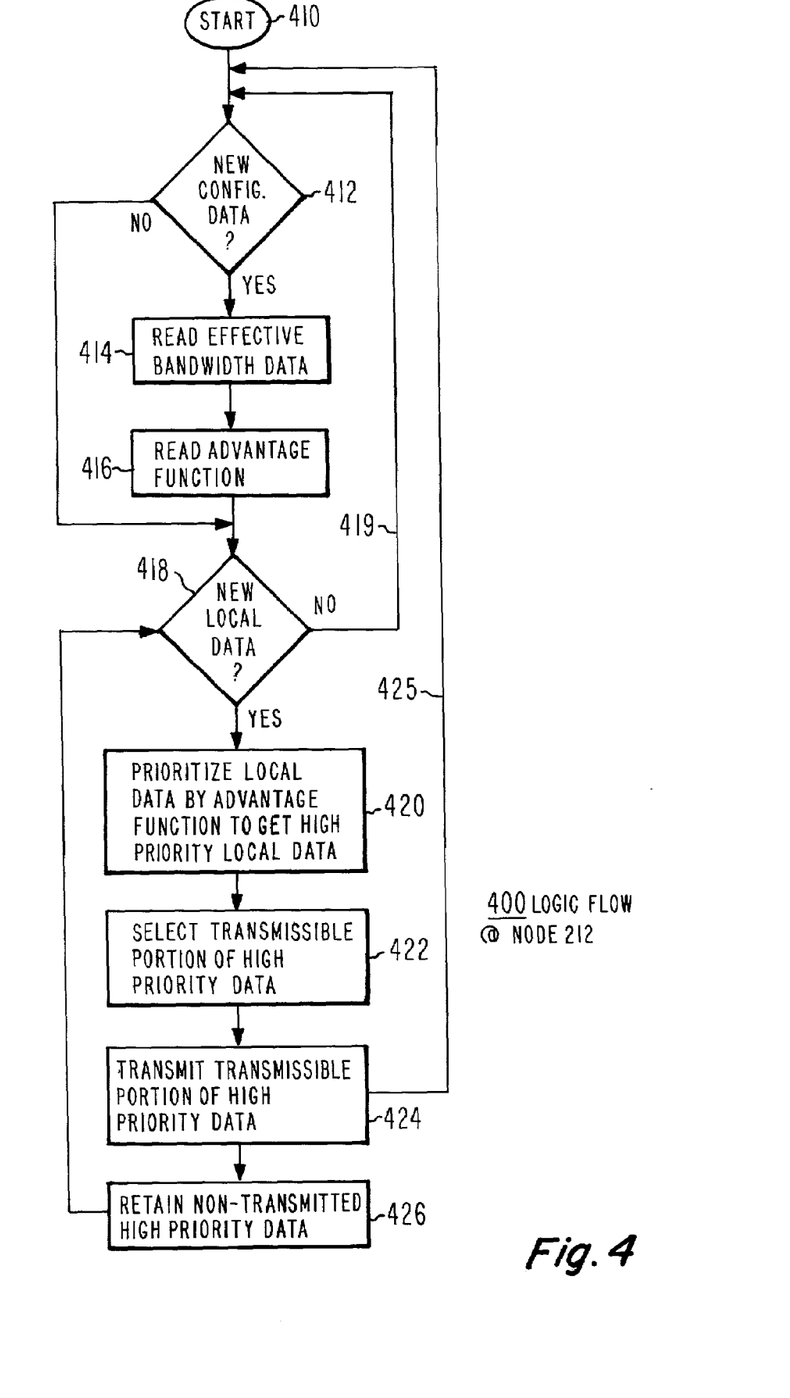
FIG. 4 is a simplified logic flow diagram or chart illustrating logic operations at another node of the system of FIG. 2, which coact with the logic of FIGS. 3a, 3b, and 3c to perform a method according to an aspect of the invention.

FIG. 4 is a simplified logic flow chart or diagram, illustrating the logic by which the second node 212 of FIG. 2 evaluates its own local data and decides what portion of the data to send to first node 211 of FIG. 2. In FIG. 4, the logic starts at a START block 410, and proceeds to a decision block 412. Decision block 412 determines if a new configuration exists. At turn-on, when the system is booting, the configuration will always be new. The logic leaves decision block 412 by the YES output, and arrives at a block 414. Block 414 represents the reading of that aspect of the configuration relating to the effective directional bandwidths from second node 212 of FIG. 2 to all the other nodes of system 200, including first node 211. From block 414 of FIG. 4, the logic flows to a further block 416, which represents the reading of the advantage function aspect of the configuration. The advantage function aspect is the perceived value to a particular remote node of receiving various types of data local to node 212 of FIG. 2. Thus, as to node 211 of FIG. 1, the example assumes that information relating to the identification friend or foe of various persons or groups is more important than, say, the presence of a building in a ravine at a distance from the personnel concentrations, or the engine temperature of the land vehicle associated with second node 212.

Consequently, the logic flow 400 of FIG. 4, performed at second node 212 of FIG. 2, evaluates its own local data, by continuing the logic flow from block 416 of FIG. 4 to decision block 418. Decision block 418 represents a determination as to the existence or nonexistence of new local data. If no new local data is available, the logic leaves decision block by the NO output, and proceeds by way of a logic path 419 back to decision block 412. If new local data is available, the logic leaves decision block 418 by the YES output, and proceeds to a block 420. Block 420 represents the prioritization of the local data by means of the advantage function, to identify high-priority local data, together with those nodes to which the various items of priority data should be sent. Different forms of data may have different importance to nodes having different tasks or goals.

From block 420 of FIG. 4, the logic flows to a block 422, which represents the selection for transmission to each node of that portion of the information which is deemed to be transmissible in view of the directional bandwidth from second node 212 of FIG. 2 to the other nodes, including first node 211. Thus, block 422 produces an array of elements of local data, together with destinations, where the size of the block(s) of local data to be sent to different ones of the other nodes will depend, at least in part, on the directional bandwidth from the second node 212 to the remote node. Block 424 represents the transmission of the data. When the transmission is completed, the logic can return to decision block 412 by way of a logic path 425. In one avatar of an aspect of the invention, that portion of the local data which was not selected for transmission may be retained in whole or in part, as represented by block 426 of FIG. 4, for re-evaluation as to priority and subsequent transmission, unless newer local data takes priority. To prevent accumulation of data which is so old as to be useless, the store of retained untransmitted date is purged of the oldest data either periodically or continually.

Figure 5:
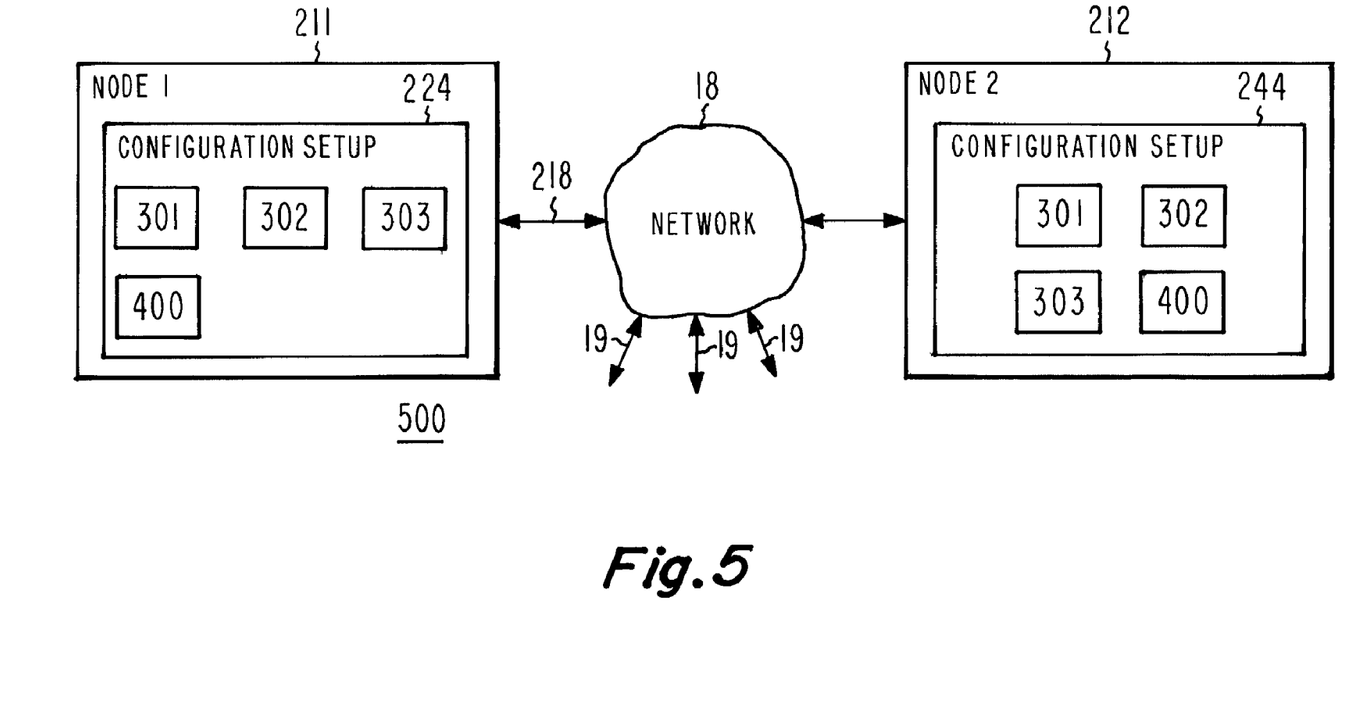
FIG. 5 is similar to FIG. 2, but in which each configuration block contains processing sets corresponding to a bidirectional system as between any two nodes.

Thus, the configuration block 224 of first node 211 of FIG. 1 may be viewed as containing the processing 301, 302, and 303 of FIGS. 3a, 3b, and 3c, respectively, and the configuration block 241 of FIG. 2 may be viewed as containing the processing 400 of FIG. 4. Such a system, as described, couples local data from node 212 to node 211, which may be viewed as a unidirectional system. However, the invention also contemplates that the selective transmission of data may be bidirectional, so that selected local data of any node may be sent to any other node of the system, and any node of the system may use the data so selected which is transmitted thereto for improving its own processing or result. This situation is illustrated in FIG. 5, which is similar to the system of FIG. 2, but in which each configuration block 224, 241 within nodes 211 and 212, respectively, contains processing sets 301, 302, 303, and 400, corresponding to a bidirectional system as between any two nodes. Since all nodes are so configured, the system may be viewed as "N-way" or the like, where each possible information transmission path constitutes a different "way."

Other embodiments of the invention will be apparent to those skilled in the art. For example, when data to be transmitted by a node to a plurality of other nodes, the data may be pooled for transmission in a broadcast or multicast mode rather than in a point-to-point mode, to further conserve bandwidth. Also, the advantage function may be derived from additional information supplied locally, rather than by explicit loading of the function. For example, where the second node is a ground station and the first node is an aircraft, the advantage function used by the second node to select information to be sent to the first node could be derived from the known position of the aircraft.

A system according to a general aspect of the invention provides communication among a plurality of nodes by way of a network having a finite bandwidth between the various nodes. The bandwidth may differ for each direction of propagation through the network. Each node includes a processor for processing locally available data, including data derived locally and available through relatively high-bandwidth paths. The processing at any one of the nodes may be improved by incorporating into the data being processed information which is locally available at another node. At least one (second) node is configured to (a) know the directional bandwidth from itself and the remote (first) nodes of the system, and (b) also to have a priori knowledge, as to each remote first node, of the relative value or improvement to be realized at the remote first node by incorporation of data of the second node into the processing of the first node. Based on the improvement or value, the second node selects portions of its own local data for transmission to the first node, and then selects that portion which can be transmitted within the available directional bandwidth.

More particularly, a method (301, 302, 303, 400) according to an aspect of the invention, for transmitting information among the nodes (211, 212) of a system or network (200) defining a directional bandwidth between node pairs, includes the step (301) of receiving (301) local information at a first (211) and second (212) nodes of the system, to thereby define first (211) and second node (212) local data, respectively. Processing (303) is performed at the first node (211) on at least a portion of the first node (211) local data, to thereby produce first node (211) processed data. At least some of the first node (211) processed data is improved by including in the processing at least some of the second node (212) local data. The second node (212) is pre-loaded with a function (416) which represents the value of the improvement to the first node (211) processed data which is gained by the incorporation into the processing at the first node (211) of various elements of the second node (212) local data. The second node (212) is also preloaded with information relating to an effective directional bandwidth (414) which is at least one of (a) the maximum value of the directional bandwidth from the second node (212) to the first node (211), (b) the maximum rate at which information can be processed at the first node (211) and (c) the lesser of the maximum value of the directional bandwidth from the second node (212) to the first node (211) and the maximum rate at which information can be processed at the first node (211). The second node (212) transmits over the network (18) to the first node (211) that portion of the second node (212) local data which (a) has the greatest value of the function and (b) can be transmitted within the effective directional bandwidth from the second node (212) to the first node (211). The "can be transmitted" aspect inherently includes the concept of time, since any amount of data can be transmitted over a limited bandwidth channel, given infinite time. In such a system incorporating more than two nodes, for each pair of nodes, the first node may execute the functions described in conjunction with FIGS. 3a, 3b, and 3c with respect to communication with the second node, and the second node may execute the functions described in conjunction with FIG. 4 with respect to communications with the first node.

In a particular mode (500) of the method according to the invention, the method according to one aspect of the invention includes the further step of performing processing (303) at the second node (212) on at least a portion of the second node (212) local data to thereby produce second node (212) processed data, which second node (212) processed data is improved by including in the processing at least some of the first node (211) local data. In addition, the first node (211) is preloaded with a function which represents the value of the improvement to the second node (212) processed data which is gained by the incorporation into the processing at the second node (212) of various elements of the first node (211) local data. The first node (211) is also preloaded with information relating to an effective directional bandwidth which is one of (a) the maximum value of the directional bandwidth from the first node (212) to the second node (212), (b) the maximum rate at which information can be processed at the second node (212) and (c) the lesser of the maximum value of the directional bandwidth from the first node (212) to the second node (211) and the maximum rate at which information can be processed at the second node (212). The first node (211) transmits, over the network to the second node (212), that portion of the first node (211) local data which has the greatest value of the function and can be transmitted within the effective directional bandwidth from the first node (211) to the second node (212). In a system according to this particular mode, where more than two nodes are present between which communications are possible, for each pair of nodes, the first node may execute the functions described in conjunction with FIG. 4 with respect to communication with the second node, and the second node may execute the functions described in conjunction with FIG. 4 with respect to communications with the first node.

What is claimed is:

1. A method for transmitting information among the nodes of a network defining a directional bandwidth between node pairs, said method including the steps of:

receiving local information at a first node of said network, to thereby define first node local data;

receiving local information at a second node of said network, to thereby define second node local data;

performing processing at said first node on at least a portion of said first node local data to thereby produce first node processed data, which first node processed data is improved by including in the processing at least some of said second node local data;

preloading said second node with a function which represents the value of the improvement to said first node processed data which is gained by the incorporation into said processing at said first node of various elements of said second node local data;

preloading said second node with information relating to an effective directional bandwidth which is at least one of (a) the maximum value of said directional bandwidth from said second node to said first node, (b) the maximum rate at which information can be processed at said first node and (c) the lesser of said maximum value of said directional bandwidth from said second node to said first node and said maximum rate at which information can be processed at said first node;

at said second node, transmitting over said network to said first node that portion of said second node local data which (a) has the greatest value of said function and (b) can be transmitted within said effective directional bandwidth from said second node to said first node.

2. A method for transmitting information among the nodes of a network defining a directional bandwidth between node pairs, said method including the steps of:

receiving local information at a first node of said network, to thereby define first node local data;

receiving local information at a second node of said network, to thereby define second node local data;

performing processing at said first node on at least a portion of said first node local data to thereby produce first node processed data, which first node processed data is improved by including in the processing at least some of said second node local data;

performing processing at said second node on at least a portion of said second node local data to thereby produce second node processed data, which second node processed data is improved by including in the processing at least some of said first node local data;

preloading said first node with a function which represents the value of the improvement to said second node processed data which is gained by the incorporation into said processing at said second node of various elements of said first node local data;

preloading said second node with a function which represents the value of the improvement to said first node processed data which is gained by the incorporation into said processing at said first node of various elements of said second node local data;

preloading said first node with information relating to an effective directional bandwidth which is one of (a) the maximum value of said directional bandwidth from said first node to said second node, (b) the maximum rate at which information can be processed at said second node and (c) the lesser of said maximum value of said directional bandwidth from said first node to said second node and said maximum rate at which information can be processed at said second node;

preloading said second node with information relating to an effective directional bandwidth which is one of (a) the maximum value of said directional bandwidth from said second node to said first node, (b) the maximum rate at which information can be processed at said first node and (c) the lesser of said maximum value of said directional bandwidth from said second node to said first node and said maximum rate at which information can be processed at said first node;

at said first node, transmitting over said network to said second node that portion of said first node local data which (a) has the greatest value of said function and (b) can be transmitted within said effective directional bandwidth from said first node to said second node;

at said second node, transmitting over said network to said first node that portion of said second node local data which (a) has the greatest value of said function and (b) can be transmitted within said effective directional bandwidth from said second node to said first node.

* * * * *